(12) United States Patent
Ota et al.

(10) Patent No.: US 10,242,640 B2
(45) Date of Patent: Mar. 26, 2019

(54) TOUCH-DISPLAY CONTROL DEVICE AND PERSONAL DATA ASSISTANT

(71) Applicant: Synaptics Japan GK, Tokyo (JP)

(72) Inventors: Shigeru Ota, Tokyo (JP); Yuri Azuma, Tokyo (JP); Takahiro Suzuki, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 210 days.

(21) Appl. No.: 14/147,512

(22) Filed: Jan. 4, 2014

(65) Prior Publication Data
US 2014/0210775 A1 Jul. 31, 2014

(30) Foreign Application Priority Data

Jan. 28, 2013 (JP) ................................ 2013/012922

(51) Int. Cl.
| | | |
|---|---|---|
| *G09G 5/00* | (2006.01) | |
| *G06F 3/041* | (2006.01) | |
| *G09G 5/395* | (2006.01) | |

(52) U.S. Cl.
CPC .......... *G09G 5/006* (2013.01); *G06F 3/0412* (2013.01); *G06F 3/0416* (2013.01); *G06F 3/0418* (2013.01); *G09G 5/395* (2013.01); *G09G 2354/00* (2013.01)

(58) Field of Classification Search
CPC .............................. G06F 3/041; G06F 3/0416
See application file for complete search history.

(56) References Cited

U.S. PATENT DOCUMENTS

| | | | |
|---|---|---|---|
| 5,638,089 A | 6/1997 | Takemoto | |
| 2001/0015727 A1* | 8/2001 | Gunji | G09G 5/001 345/531 |
| 2002/0047581 A1* | 4/2002 | Koyama | G09G 3/3233 315/169.3 |
| 2007/0257890 A1 | 11/2007 | Hotelling et al. | |

(Continued)

FOREIGN PATENT DOCUMENTS

| | | |
|---|---|---|
| JP | 7-182107 | 7/1995 |
| JP | 2006-301655 A | 11/2006 |

(Continued)

OTHER PUBLICATIONS

Office Action dated Oct. 6, 2016 for related Japanese Application No. 2013-012922.

*Primary Examiner* — Michael A Faragalla
*Assistant Examiner* — Chayce R Bibbee
(74) *Attorney, Agent, or Firm* — Patterson + Sheridan, LLP (57) ABSTRACT

Provided are a touch display control device and an information terminal device, which are arranged so that the noise resulting from the actions for activation and display on a display panel, and the noise caused by the actions of activation and detection on a touch sensor never affects each other, and are useful for suppressing the elicitation of the difference in brightness attributed to non-display in a display frame.

The information terminal device includes: a display controller operable to change start timings of display and non-display periods in a cycle of a frame synchronizing signal of a display frame, in each cycle of the frame synchronizing signal or each sequence of cycles thereof; and a touch panel controller operable to perform the activation of a touch panel and a touch detection during the non-display period.

21 Claims, 7 Drawing Sheets

(56) References Cited

U.S. PATENT DOCUMENTS

| | | | | |
|---|---|---|---|---|
| 2012/0019454 A1* | 1/2012 | Huang | ............... | G06F 3/044 |
| | | | | 345/173 |
| 2012/0169629 A1* | 7/2012 | Shih | ............... | G06F 3/0412 |
| | | | | 345/173 |
| 2013/0314360 A1* | 11/2013 | Saitoh | ............... | G06F 3/0412 |
| | | | | 345/173 |
| 2013/0314361 A1 | 11/2013 | Saitoh et al. | | |
| 2014/0062907 A1* | 3/2014 | Kim | ............... | G06F 3/038 |
| | | | | 345/173 |

FOREIGN PATENT DOCUMENTS

| | | |
|---|---|---|
| JP | 2012-234475 A | 11/2012 |
| WO | 2012-137800 A1 | 10/2012 |

\* cited by examiner

TOUCH-DISPLAY CONTROL DEVICE AND PERSONAL DATA ASSISTANT

CROSS-REFERENCE TO RELATED APPLICATIONS

The Present application claims priority from Japanese application JP 2013-012922 filed on Jan. 28, 2013, the content of which is hereby incorporated by reference into this application.

BACKGROUND

The present invention relates to a touch display controller which controls the display of a display panel and the driving and detection of a touch panel, and an information terminal device with the touch display controller, and a technique useful in application to portable information terminal devices including e.g. a tablet and a smart phone.

A portable information terminal such as a tablet or a smart phone has, on its front face, a display panel and a touch panel which are superposed on each other or integrally formed. Such portable information terminal is arranged so that the action intended can be identified from touch coordinates of a multipoint touch performed on the touch panel according to screen display of the display panel. A mutual capacitance type touch panel which supports multipoint touch has a number of detection capacitances formed at intersections where the drive and detection electrodes intersect one another like a matrix, and integrates potential changes arising on the detection electrodes through detection capacitances while driving the drive electrodes sequentially thereby forming detection signals. In case that a finger is brought close to the detection capacitances, the stray capacitance of the finger is combined with the detection capacitances, and thus the combined capacitance values become smaller. A mutual capacitance type touch panel is arranged to discriminate between the states of "being touched" and "being untouched" based on the differences of the detection signals according to the changes of the capacitance values. A touch panel of this type has been described in e.g. U.S. Patent Application No. 20070257890A1.

A liquid crystal panel has a thin-film transistor referred to as TFT arranged at each intersection point of the scan and signal electrodes arranged to intersect with one another; thin-film transistors each have a gate connected to the scan electrode, and a source connected to the signal electrode, and a drain connected to a common electrode through a liquid crystal element and a storage capacitor which constitute a sub-pixel, and each form a pixel. In display control, the scan electrodes are driven sequentially, the thin-film transistors are turned ON for each scan electrode, and thus current is caused to flow between the source and drain of TFTs concerned. The signal voltages supplied to the source electrodes at this time are applied to the liquid crystal elements, thereby bringing them into a transmissive state. Such TFT liquid crystal panel has been described in e.g. JP-A-2006-301655.

It is described in JP-A-2012-234475 that the rise of a drive pulse voltage for driving scan electrodes of the touch panel causes noise to affect a liquid crystal panel through the capacitive coupling between a display panel and a touch panel superposed on each other or integrally formed, etc. In JP-A-2012-234475, the measure of making selectable the waveform of a drive pulse for driving the scan electrodes is taken.

SUMMARY

The inventor made a study on that the influence of noise through the capacitive coupling between a display panel and a touch panel superposed on each other or integrally formed reaches the display panel and spreads even to the touch panel. As a result, it was found that by activating the touch panel during not the display period of the display panel, but the non-display period in a cycle of the frame synchronizing signal to perform a touch detection, it becomes possible to avoid that the noise resulting from the actions for activation and display on the display panel, and the noise caused by the actions of activation and detection on the touch sensor influence each other.

Unlike touch sensing during a whole frame cycle period, the touch sensing only for a non-display period can worsen an response action to the touch sensing. In short, the frequency with which a coordinate calculation using detection data obtained by touch sensing is executed is only once per frame cycle. Further, in case that the relation between a display period and a non-display period in a cycle of the frame synchronizing signal is fixed, the difference in brightness will appear in a display frame. Especially, in the case of attempting to improve the action of responding to touch sensing by setting a non-display period in a frame cycle at least twice, the difference in brightness in a display frame is considered to further come to the fore.

It is an object of the invention to provide a touch display controller arranged so as to avoid that the noise resulting from the actions for activation and display on the display panel, and the noise caused by the actions of activation and detection on the touch sensor influence each other, and to serve to suppress the surfacing of the difference in brightness incident to non-display in a display frame. Further, it is an object to provide an information terminal device so arranged.

The above and other problems of the invention and novel features thereof will become apparent from the description hereof and the accompanying drawings.

Of the embodiments herein disclosed, the representative embodiment will be briefly outlined below.

That is, the following two devices are adopted according to the embodiment. The first is a display controller operable to change start timings of display period and non-display periods in a cycle of the frame synchronizing signal of a display frame in each cycle of the frame synchronizing signal or each sequence of cycles thereof, and the second is a touch panel controller operable to perform the activation of a touch panel and touch detection in the non-display period.

Of the embodiments herein disclosed, the representative embodiment brings about the effect as briefly described below.

The noise resulting from the actions for activation and display on the display panel, and the noise caused by the actions of activation and detection on the touch sensor never influence each other. Further, the start timings of display and non-display periods are both variable, which is useful for suppressing an undesired difference in brightness attributed to non-display arising in a fixed portion in a display frame. Especially in the case of setting the non-display time in a display frame more than once, the undesired difference in brightness attributed to non-display tends to appear as flicker, but even the flicker attributed to such difference in brightness can be suppressed by the variable control of the non-display timing.

DETAILED DESCRIPTION

1. Summary of the Embodiments

The embodiments herein disclosed will be outlined, first. Here, the reference numerals for reference to the drawings, which are accompanied with paired round brackets, only exemplify what the concepts of members or components referred to by the numerals involve.

[1] <Variable Control of the Timing of Display and Non-Display in Frame Cycle, and Touch Detection in Non-Display>

A touch display controller (1) has: a display controller (4) operable to control the display of a display panel (2) in synchronization with a frame synchronizing signal of a display frame; and a touch panel controller (6) operable to activate a touch panel (3) and perform a touch detection. The display controller has a first control part (26) operable to change start timings of display and non-display periods in a cycle of the frame synchronizing signal (VSYNC) in each cycle of the frame synchronizing signal or each sequence of cycles thereof. The touch panel controller has a second control part (14) operable to perform activation of the touch panel and the touch detection in the non-display period.

In this embodiment, the start timings of display and non-display periods are both variable. Therefore, the noise resulting from the actions for activation and display on the display panel, and the noise caused by the actions of activation and detection on the touch sensor never influence with each other. Further, the start timing of non-display in a display frame is not fixed and as such, it is possible to suppress an undesired difference in brightness attributed to non-display arising in a fixed portion in the display frame. Especially, in the case of setting a non-display time in a display frame more than once, the undesired difference in brightness attributed to non-display tends to appear as flicker, but the variable control of the non-display timing makes it harder to see even for the flicker attributed to such difference in brightness to appear.

[2] <Formation of Three Display Periods and Two Non-Display Periods in a Cycle of the Frame Synchronizing Signal>

Figure 2:
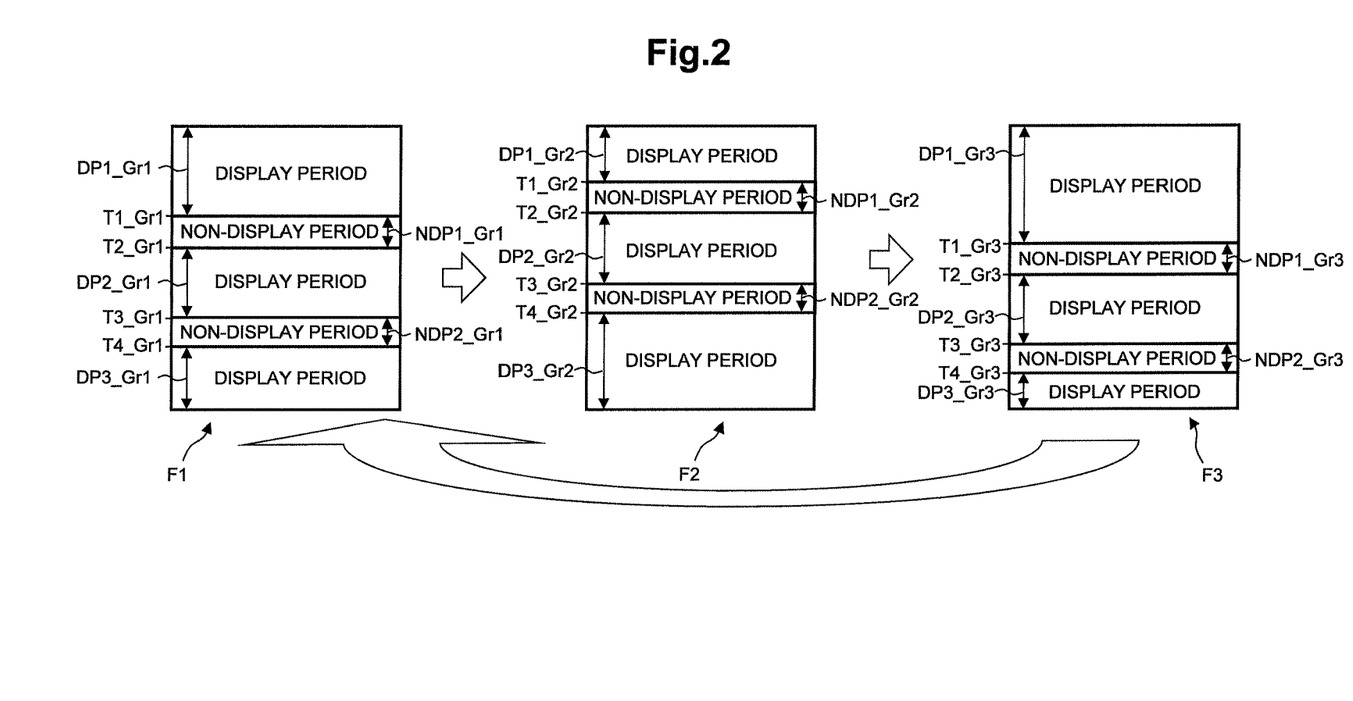
FIG. 2 is an explanatory diagram showing, by example, a situation in which the start timings of display and non-display periods are variably controlled.

In the touch display controller as described in [1], the first control part forms, in a cycle of the frame synchronizing signal, three display periods (PD1_Gri, PD2_Gri and PD3_Gri of FIG. 2), and two non-display periods (NPD1_Gri and NPD2_Gri of FIG. 2).

According to the embodiment like this, the following are made possible: to set the non-display period in a frame cycle twice; to perform a coordinate calculation which uses detection data according to touch sensing in a frame cycle at a frequency of two; and to increase the speed of response to touch sensing. Since the start timing of a non-display period is variable, the flicker resulting from the undesired difference in brightness attributed to non-display is made harder to see even in case that the non-display time is set in a display frame more than once.

[3] <Formation of Two Display Periods and One Non-Display Period in a Cycle of the Frame Synchronizing Signal>

Figure 6:
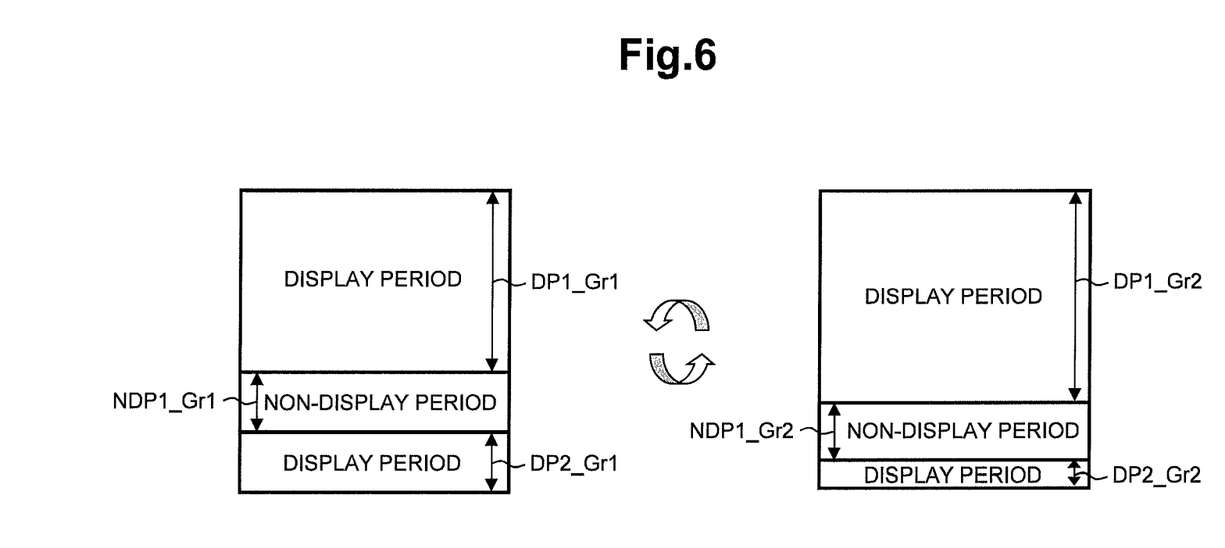
FIG. 6 is an explanatory diagram showing, by example, another situation in which start timings of display and non-display periods are variably controlled.

In the touch display controller as described in [1], the first control part forms, in a cycle of the frame synchronizing signal, two display periods (PD1_Gri and PD2_Gri of FIG. 6), and one non-display period (NPD1_Gri of FIG. 6).

According to the embodiment like this, even in the case of setting one non-display period in a frame cycle, the start timing of the non-display period is variable and as such, the flicker in a display frame, which originates from an undesired difference in brightness attributed to non-display is made hard to see.

[4] <Change the Arrangement of Display and Non-Display Periods so as that the Arrangement Comes Full Circle in Each Sequence of Cycles of the Frame Synchronizing Signal>

In the touch display controller as described in any one of [1] to [3], the first control part changes, in units of the cycles of the frame synchronizing signal, start timings of display and non-display periods so that start times of the display and non-display periods complete a cycle in each sequence of cycles of the frame synchronizing signal (FIGS. 2 and 6).

According to the embodiment like this, the start timings of display and non-display are changed cyclically. Therefore, the variable control can be performed efficiently.

[5] <Formation of a Non-Display Period with a Buffer Memory Used as a Frame Buffer>

In the touch display controller as described in [2] or [3], the display controller has a buffer memory (22). The first control part reads out data written in the buffer memory in units of display frames to perform display control, and adjourns the action of reading out data from the buffer memory in units of display frames during the non-display period.

According to the embodiment like this, in the case of using a buffer memory as a frame buffer for display control, the non-display timing can be controlled in a relatively simple manner by means of the control of temporarily adjourning the action of reading out data for display from the buffer memory.

[6] <Formation of a Non-Display Period with a Buffer Memory Used as a Delay Buffer>

In the touch display controller as described in [2], the display controller has a buffer memory (BUF1-BUF8). The first control part uses the buffer memory as a delay buffer for delaying display control of display data by the non-display period, and as control of the delay buffer, starts the action of writing display data into the buffer memory from a first non-display period without writing display data into the buffer memory from a display period at a top of a display frame to the first non-display period, starts reading out display data written in the buffer memory from an end of the first non-display period, suspends reading out from the buffer memory in line with the start of a subsequent display period, and further resumes reading out from the buffer memory at an end of a subsequent non-display period.

According to the embodiment like this, in a case such that display is performed while following display data streams without drawing display data in the frame buffer, the control of temporarily storing display data in a buffer memory used as a delay buffer during a non-display period is performed, whereby the control of forming the non-display timing more than once in a frame cycle can be performed in a relatively simple way.

[7] <Formation of Non-Display Period with a Buffer Memory Used as a Delay Buffer>

In the touch display controller as described in [3], the display controller has a buffer memory (BUF1-BUF8). The first control part uses the buffer memory as a delay buffer for delaying display control of display data by the non-display period, and as control of the delay buffer, starts the action of writing display data into the buffer memory from the first non-display period without writing display data into the buffer memory from a display period at a top of a display frame to a first non-display period, and starts reading out display data written in the buffer memory from an end of the first non-display period.

According to the embodiment like this, in a case such that display is performed while following display data streams without drawing display data in the frame buffer, the control of temporarily storing display data in a buffer memory used as a delay buffer during a non-display period is performed, whereby the control of forming the non-display timing once in a frame cycle can be performed in a relatively simple way.

[8] <Decide the Arrangement of Display and Non-Display Periods Using Frame and Line Counters>

In the touch display controller as described in [4], the first control part has: a frame counter (30) operable to count display frames based on the frame synchronizing signal; a line counter (31) operable to count display lines based on a display-line-synchronizing signal in a display frame; and a logic circuit (33, 34) operable to decide start timings of display and non-display periods based on a result of comparison between a count value of the line counter and an expected value thereof, and a count value of the frame counter. The expected value of the count value of the line counter is changed according to the count value of the frame counter.

According to the embodiment like this, it is possible to relatively readily materialize, by use of count values of the frame and line counters, the control of changing the start timings of display and non-display in units of cycles of the frame synchronizing signal so that the start times of display and non-display complete a cycle in each sequence of cycles of the frame synchronizing signal.

[9] <Decide the Start and End Lines of the Non-Display Period According to Expected Value Group of the Line Counter>

In the touch display controller as described in [8], the logic circuit selects one of expected value groups having expected values of the count value of the line counter according to the count value of the frame counter, and decides start-line and end-line positions of the non-display period with a count timing of the line counter matching with an expected value of the selected expected value group.

According to the embodiment like this, the logic circuit can be arranged in a relatively simple way.

[10] <Select of Expected Value Group According to a Set Value on a Mode Register>

In the touch display controller as described in [9], the first control part further has a mode register (37) on which mode data for selecting, from the expected value groups, a predetermined expected value group to be compared to the count value of the line counter is rewritably set.

According to the embodiment like this, it becomes possible to select optimal display and non-display timings according to a property of a display image, characteristics of touch and display panels, or the like.

[11] <Semiconductor Device>

In the touch display controller as described in [1], the touch display controller is a semiconductor device (4) formed in one semiconductor substrate.

According to the embodiment like this, even if the touch display controller is a single device, it is possible to suppress the influence of noise that the display controller and the touch panel controller mounted on a chip exert on each other, or one of which has on the other.

[12] <Variable Control of the Timing of Display and Non-Display in Frame Cycle, and Touch Detection in Non-Display>

The information terminal device has: a display panel; a touch panel superposed on the display panel, and enabling a touch detection according to a mutual capacitance technique; a display controller operable to perform display control of the display panel in synchronization with a frame synchronizing signal of a display frame; and a touch panel controller operable to drive the touch panel and perform a touch detection. The display controller is capable of changing start timings of display and non-display periods in a cycle of the frame synchronizing signal in each cycle of the frame synchronizing signal or each sequence of cycles thereof. The touch panel controller performs the activation of the touch panel, and a touch detection in the non-display period.

According to the embodiment like this, the start timings of display and non-display periods are both variable and therefore, the noise resulting from the actions for activation and display on the display panel, and the noise caused by the actions of activation and detection on the touch sensor does not affect each other. Further, the start timing of non-display is not fixed in a display frame. Therefore, it is possible to suppress the appearance of an undesired difference in brightness attributed to the non-display in a fixed portion in a display frame. Especially, in the case of setting the non-display timing in a display frame more than once, the undesired difference in brightness attributed to non-display tends to appear as flicker. However, the variable control of the non-display timing makes the flicker coming from such difference in brightness less prone to appear. Hence, this arrangement can contribute to enhance both the display quality of a display panel and detection performance of a touch panel.

[13] <Variable Control of the Timing of Display and Non-Display in Frame Cycle, and Touch Detection in Non-Display>

The information terminal device has: a display panel; a touch panel superposed on the display panel and enabling a touch detection according to a mutual capacitance technique; a display controller operable to perform display control of the display panel in synchronization with a frame synchronizing signal of a display frame; and a touch panel controller operable to drive the touch panel and perform a touch detection. The display controller is capable of changing the arrangement of display and non-display periods in a cycle of the frame synchronizing signal in each cycle of the frame synchronizing signal or each sequence of cycles thereof. The touch panel controller performs the activation of the touch panel and the touch detection in the non-display period.

According to the embodiment like this, the same effect and advantage as those achieved by the information terminal device as described in [12].

2. Further Detailed Description of the Embodiments

The embodiments will be described further in detail.

Figure 1:
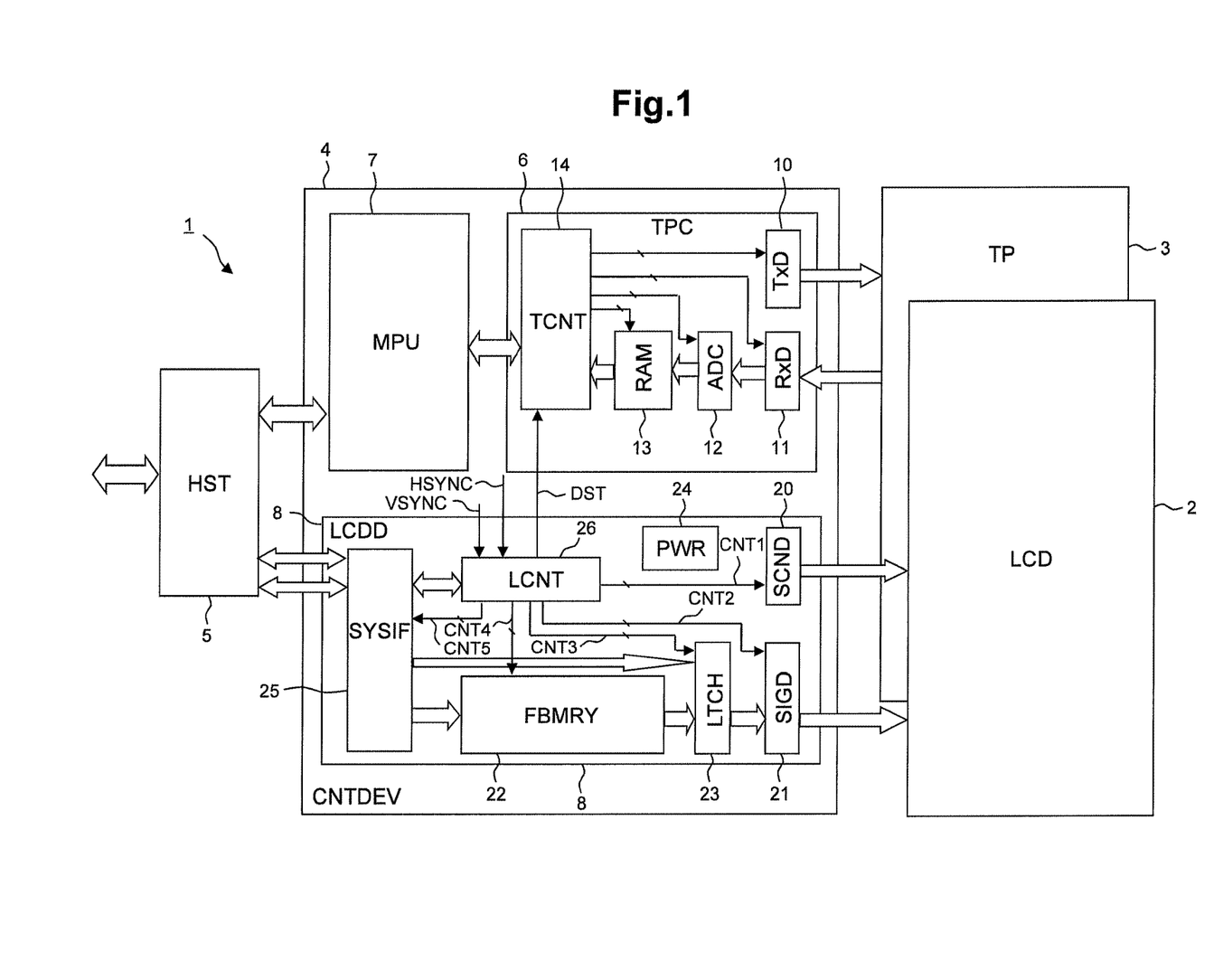
FIG. 1 is a block diagram showing, by example, the structure of a portable information terminal device such as a tablet or a smart phone with a touch display controller applied thereto.

FIG. 1 shows, by example, the structure of a portable information terminal device such as a tablet or a smart phone which a touch display controller is applied to. In the portable information terminal device 1 shown in the drawing, a dot matrix type display panel, e.g. a liquid crystal panel (LCD) 2, and a touch panel (TP) 3 are arranged on a surface of the housing in combination, and the touch panel enables the touch detection according to the mutual capacitance technique. For instance, an external attachment structure in which the touch panel 3 is superposed on the display plane of the liquid crystal panel 2, or an in-cell structure in which the touch panel 3 is built in the liquid crystal panel 2 may be adopted for the touch panel 3.

Although not particularly shown in the drawing, the liquid crystal panel 2 has e.g. a thin-film transistor referred to as "TFT" at each intersection point of scan and signal electrodes arranged to intersect with one another; thin-film transistors each have a gate connected to the scan electrode, and a source connected to the signal electrode, and a drain connected to a common electrode through a liquid crystal element and a storage capacitor which constitute a sub-pixel, and each form a pixel. In display control, the scan electrodes are driven sequentially, the thin-film transistors are turned ON for each scan electrode, and thus current is caused to flow between the source and drain of TFTs concerned. The signal voltages supplied through the signal electrodes to the sources of TFTs at this time are applied to the liquid crystal elements, thereby bringing them into a transmissive state.

Although not particularly shown in the drawing, the mutual capacitance type touch panel 3 supporting multipoint touch has a number of detection capacitances formed at the points where drive and detection electrodes intersect with one another like a matrix, for example. While the drive electrodes are driven sequentially, the touch panel integrates potential changes arising on the detection electrodes through the detection capacitances to form detection signals. In case that a finger is brought close to the detection capacitances, the stray capacitance of the finger is combined with the detection capacitances, and thus the combined capacitance values become smaller. The mutual capacitance type touch panel is arranged to discriminate between the states of "being touched" and "being untouched" based on the differences of the detection signals according to the changes of the capacitance values. Because of using the touch panel 3 superposed on the liquid crystal panel 2, the operation performed can be determined from touch coordinates subjected to a multipoint touch conducted on the touch panel 3 according to display on a screen of the liquid crystal panel 2. The control and the arithmetic calculation process therefor are performed by the controller device (CNTDEV) 4 and the host processor (HST). Although no special restriction is intended, a portable information terminal device is formed by connecting the host processor 5 with a communication control unit, an image-processing unit, an audio-processing unit, and other devices including an accelerator, which are not shown in the drawing.

Although no special restriction is intended, in FIG. 1 the touch display controller is materialized as a controller device 4 operable to control the liquid crystal panel 2 and the touch panel 3. Although no special restriction is intended, the controller device 4 has a touch panel controller (TPC) 6, a subprocessor (MPU) 7, and a liquid crystal driver (LCDD) 8, and is formed in one semiconductor substrate of monocrystalline silicon or the like by means of CMOS IC manufacturing technique.

The touch panel controller 6 activates the touch panel 3 to perform a touch detection. The subprocessor 7 provides an instruction about an action to the touch panel controller 6 according to a command provided by the host processor (HST) 5, and performs a coordinate calculation of a touch position while using detection data which the touch panel controller 6 has taken from the touch panel 3. The host processor (HMPU) 5 creates display data. The liquid crystal driver 8 performs the display control for displaying, on the liquid crystal panel 2, the display data provided by the host processor 5. In case that the touch panel 3 is being touched, the host processor 5 takes position coordinate data from the subprocessor 7, and analyzes an input resulting from an operation on the touch panel 3 based on the relation between the position coordinate data and a frame of display image provided to and displayed by the liquid crystal driver 8.

As shown in FIG. 1, the touch panel controller 6 has e.g. a drive circuit (TxD) 10, a detection circuit (RxD) 11, an analog-to-digital conversion circuit (ADC) 12, RAM 13 and a second control part (TCNT) 14. The drive circuit 10 outputs a drive pulse to drive electrodes of the touch panel 3 sequentially. A voltage change developed on each detection electrode through a detection capacitance connected with the driven drive electrode is accumulated by an integration circuit of the detection circuit 11. In this way, a detection signal is formed for each detection electrode. The detection signal which is an analog signal is converted into a digital signal by ADC 12. The resultant digital signal is accumulated by RAM 13 as detection data. The second control circuit 14 controls the timing of activation of the drive circuit 10 and controls, in synchronization with the activation timing, the action timings of the detection circuit 11 and ADC 12, and the writing action on RAM 13. The detection data obtained by the action of driving the drive electrodes for the whole screen of touch panel 3, and the action for detection on the whole screen, i.e. the actions of activation and detection on the touch panel 3 for each frame are accumulated by RAM 13. Then, the second control circuit 14 determines whether the touché panel is being touched or not from the detection data, calculates the position coordinate of a touch position in the touch panel 2, and provides a result of the calculation to the host processor 5.

As shown in FIG. 1, the liquid crystal driver 8 has e.g. a scan-drive circuit (SCND) 20, a gradation-drive circuit (SIGD) 21, a frame buffer memory (FBMRY) 22, a line latch circuit (LTCH) 23, a power supply circuit 24, a system interface circuit (SYSIF) 25, and a first control circuit (LCNT) 26 operable to perform the overall control the liquid crystal driver 8. The liquid crystal driver 8 performs the display control of the liquid crystal panel 2 in synchronization with the frame synchronizing signal. In FIG. 1, a vertical synchronizing signal VSYNC serves as the frame synchronizing signal, for example. In the frame cycle representing one cycle of the vertical synchronizing signal VSYNC, the number of cycles of a horizontal synchronizing signal HSYNC corresponding to the scan electrodes of the touch panel 2 in quantity is included. Although no special restriction is intended, the vertical synchronizing signal VSYNC and the horizontal synchronizing signal HSYNC are supplied to the first control circuit 26 from outside the controller device 4.

The system interface 25 receives a display command and display data from the host processor 5. The received display data are directly forwarded to the line latch circuit 23 in synchronization with the display timing, or drawn on the frame buffer memory 22 by the display frame and then forwarded to the line latch circuit 23 by the display line according to the display form thereof. It is assumed here that the frame buffer memory 22 is also used as a delay buffer, the detail of which will be described later.

The forwarding of display data to the line latch circuit 23 is performed in each horizontal scan period arranged in synchronization with the horizontal synchronizing signal. The gradation-drive circuit 21 outputs gradation voltages to the signal electrodes of the liquid crystal panel 2 according to display data latched by the line latch circuit 23 in parallel. The scan-drive circuit 20 sequentially drives the scan electrodes of the liquid crystal panel 2 in synchronization with the horizontal synchronizing signal HSYNC in each frame cycle. In this way, the thin-film transistors are turned ON in units of scan electrodes, whereby current is caused to flow between the sources and drains thereof; at this time, the gradation-drive circuit 21 applies signal voltages as gradation voltages to the sources and therefore to the liquid crystal elements through the signal electrodes based on display data latched by the line latch circuit 23 in each horizontal scan period. Thus, the liquid crystal elements are driven in units of display lines in synchronization with sequential scan-driving of the scan electrodes in units of frame cycles, according to gradation data. A gradation voltage output by the gradation-drive circuit 21, an operation-drive voltage output by the scan-drive circuit 20, and the like are generated by the power supply circuit 24.

The first control circuit 26 performs the overall control of the liquid crystal driver 8 including the above-described display control according to a display command provided by the host processor 5. The reference label CNT1 represents a drive-control signal for the scan-drive circuit 20; CNT2 represents a drive-control signal for the gradation-drive circuit 21; CNT3 represents a latch-control signal for the line latch circuit 23; CNT4 represents an access-control signal for the frame buffer memory 22; and CNT4 represents an input-and-output-control signal for the system interface circuit 25. Especially, the first control circuit 26 has the control function of changing start timings of display and non-display periods in cycles of the vertical synchronizing signal VSYNC in each cycle of the vertical synchronizing signal VSYNC or each sequence of cycles thereof. For instance, FIG. 2 shows, by example, a situation in which the start timings of display and non-display periods are variably controlled. It is assumed here that the variable control is repeatedly performed in three display frames F1, F2 and F3. Each display frame has three display periods and two non-display periods; the display frames F1, F2 and F3 are different from one another in both the start timings of the display and non-display periods. In the display frame F1, the start of the first display period DP1_Gr1 synchronizes with the start of a cycle of the vertical synchronizing signal; the start timing of the first non-display period NDP1_Gr1 subsequent thereto (coincident with the end timing of the first display period) is denoted by T1_Gr1; the start timing of the subsequent display period DP2_Gr1 (coincident with the end timing of the first non-display period) is denoted by T2_Gr1; the start timing of the subsequent non-display period NDP2_Gr1 is denoted by T3_Gr1; and the start timing of the last display period DP3_Gr1 (coincident with the end timing of the second non-display period) is denoted by T4_Gr1. In the display frame F2, these timings are denoted by T1_Gr2, T2_Gr2, T3_Gr2 and T4_Gr2, respectively; and their periods are denoted by DP1_Gr2, NDP1_Gr2, DP2_Gr2, NDP2_Gr2 and DP3_Gr2 respectively. In the display frame F3, these timings are denoted by T1_Gr3, T2_Gr3, T3_Gr3, and T4_Gr3; and their periods are denoted by DP1_Gr3, NDP1_Gr3, DP2_Gr3, NDP2_Gr3, and DP3_Gr3. The respective timings correspond to times in a frame cycle, and differ from one another. Although no special restriction is intended, the display periods PD1_Gri, PD2_Gri and PD3_Gri (i=1, 2, 3) are different from one another, whereas the non-display periods NPD1_Grj and NPD2_Grj (j=1, 2) are coincident with each other. The display period herein described is equivalent to "display-working period"; and the non-display period is equivalent to "non-display-action period", and "display-action-stop period".

The first control circuit 26 notifies, by means of a display-status signal DST, the second control circuit 14 of the touch panel controller 6 of the fact of being in a non-display period of the liquid crystal panel 2. The second control circuit 14 performs the activation of the touch panel 3 and the touch detection in the non-display period notified by the display-status signal DST. Although no special restriction is intended, the second control circuit 14 drives the drive electrodes of the touch panel 3 once while scanning them in each non-display period, and causes the touch panel controller to execute the action of acquiring detection data for the whole screen of the touch panel 3 (the action of touch detection on the touch frame).

Figure 3:
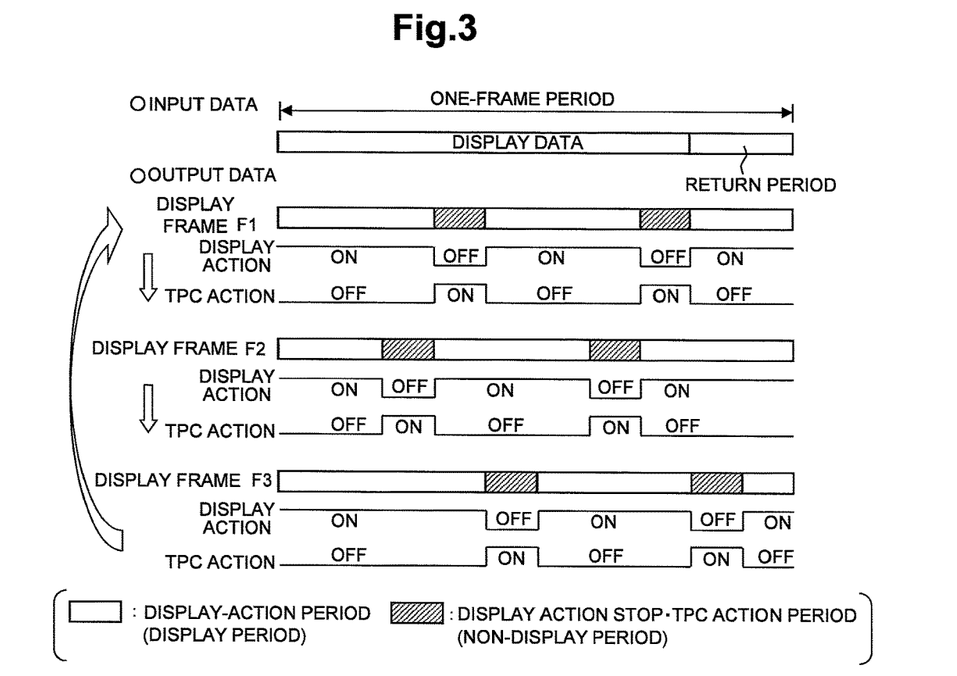
FIG. 3 is a timing diagram showing, by example, principal action timings in the case of performing the touch detection in a non-display period set in line with the non-display variable timing shown in FIG. 2.

FIG. 3 shows, by example, principal action timings in the case of performing the touch detection in a non-display period set in line with the non-display variable timing shown in FIG. 2.

In FIG. 3, the column of the input data shows the action timing in case that the host device 5 provides display data to the liquid crystal driver 8; the column of the output data shows the action timing in case that the liquid crystal driver 8 outputs display data to the liquid crystal panel 2. The timing of the input data column and the timing of the output data column do not necessarily coincide with each other in terms of time; for the sake of convenience, one-frame periods (representing one cycle of the vertical synchronizing signal VSYNC) are parallelized to each other and shown. In the case of transferring to a display process after having stored display data in the frame buffer memory 22 for a time, the data output timing in the output data column is greatly delayed with respect to the data input timing in the input data column. On the other hand, in the case of displaying display data supplied from the host processor 5 in real time as they are, the data-output timing of the output data column is delayed with respect to the data-input timing of the input data column by a length of time as long as a delay caused by an internal action. The notation ON concerning the display action in the drawing denotes a display period; and the notation OFF denotes a non-display period, which represents a period for the touch panel activation and detection (TPC action period). The non-display period is changed depending on the display frames F1, F2 and F3.

Figure 4:
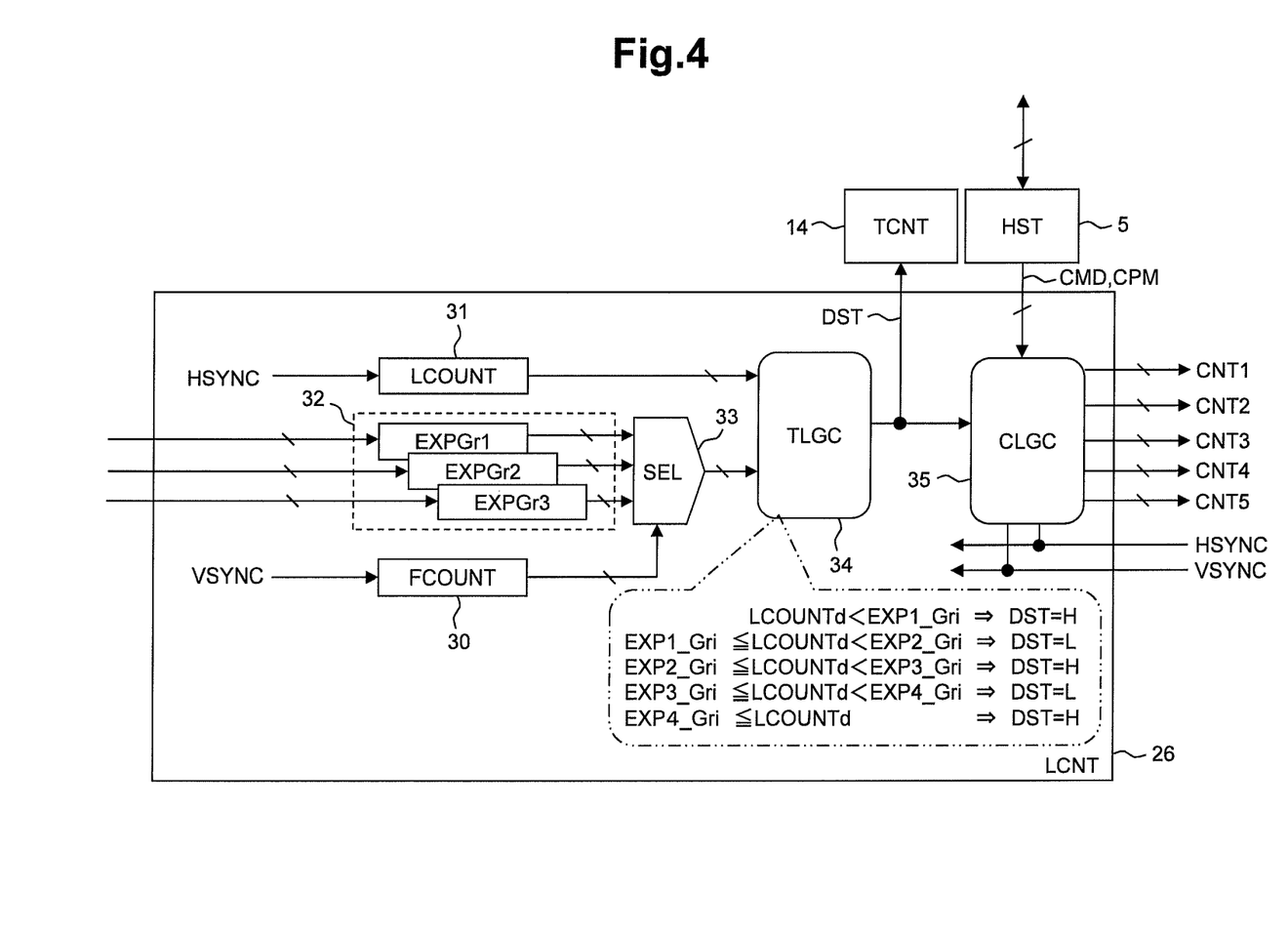
FIG. 4 is a block diagram showing a specific embodiment of a control logic operable to cyclically change start timings of display and non-display periods in units of display frames so that they never coincide with each other.

FIG. 4 shows a specific embodiment of a control logic operable to cyclically change start timings of display and non-display periods in units of display frames so that they never coincide with each other. The first control circuit 26 has a frame counter (FCOUNT) 30, a line counter (LCOUNT) 31, an expected-value-register circuit 32, a selector (SEL) 33, a display/non-display period control logic (TLGC) 34, and a command control logic (CLGC) 35 operable to perform the overall control of the display action.

While the frame counter 30 is a counter operable to count display frames, i.e. the vertical synchronizing signals VSYNC, it serves as a wrap-around counter which counts from the initial value 0 to 2, and then returns back to the initial value, and thereafter repeats the counting action.

The line counter 31 is a counter which counts display lines in a display frame, i.e. the horizontal synchronizing signals HSYNC, the count value of which is cleared in every cycle of the vertical synchronizing signal VSYNC.

On the expected-value-register circuit 32, three groups EXPGr1, EXPGr2 and EXPGr3 of expected value data each having more than one expected value of the count value of the line counter 31 are set rewritably. The group EXPGr1 of expected value data are data of display line numbers (display line number data) for defining the timings T1_Gr1, T2_Gr1, T3_Gr1 and T4_Gr1 in the frame F1 of FIG. 2 respectively. The group EXPGr2 of expected value data are data of display line numbers (display line number data) for defining the timings T1_Gr2, T2_Gr2, T3_Gr2 and T4_Gr2 in the frame F2 of FIG. 2 respectively. The group EXPGr3 of expected value data are data of display line numbers (display line number data) for defining the timings T1_Gr3, T2_Gr3, T3_Gr3 and T4_Gr3 in the frame F3 of FIG. 2 respectively.

The selector 33 serves to select one group of expected value data according to the count value of the frame counter 30. Specifically, the selector 33 selects the group EXPGr1 of expected value data in case with the count value equal to the initial value 0, selects the group EXPGr2 of expected value data with the count value equal to the initial value 1, and selects the group EXPGr3 of expected value data with the count value equal to the initial value 2.

According to the magnitude relation between the count value (LCOUNTd) of the line counter 31 and the expected value of the group EXP_Gri of expected value data (i=1, 2, 3) selected by the selector 33, the period-control logic 34 decides the level of the display-status signal DST as described below.
(1) DST=H level with LCOUNTd<EXP1_Gri,
(2) DST=L level with EXP1_Gri≤COUNTd<EXP2_Gri,
(3) DST=H level with EXP2_Gri≤LCOUNTd<EXP3_Gri,
(4) DST=L level with EXP3_Gri≤LCOUNTd<EXP4_Gri, and
(5) DST=H level with EXP4_Gri≤LCOUNTd.

Accordingly, the period-control logic 34 decides the start-line position of the non-display period and the end-line position thereof with the count timings of the line counter coincident with expected values of the expected value group selected by the selector 33. In short, High level of the display-status signal DST represents a display period, and Low level represents a non-display period.

The command control logic 35 provided with the display-status signal DST is supplied with a command CMD and a command parameter CPM from the host processor 5, and then uses a result of decode of the command CMD, and the command parameter CPM to produce the control signals CNT1, CNT2, CNT3, CNT4 and CNT5. The control signals CNT1, CNT2, CNT3, CNT4 and CNT5 are produced according to their control function in synchronization with the vertical synchronizing signal VSYNC and the horizontal synchronizing signal HSYNC; especially, in a non-display period of the display-status signal DST, the new driving of the scan electrodes by the scan-drive circuit 20, the driving of the signal electrodes by the gradation-drive circuit 21, and the action of newly latching display data by the line latch circuit 23, and the like are adjourned, whereby the action of display in this period is stopped. Further, the second control circuit 14 of the touch panel controller 6, which is supplied with the display-status signal DST, performs the action of touch detection on a touch frame in the non-display period of the display-status signal DST.

To perform the display control in such a way that display data are stored in the frame buffer memory 22 for a time, and then supplied to the line latch 23, the command control circuit 35 may adjourn the action of reading data from the frame buffer memory 22 in units of display frames during the non-display period.

In contrast, a buffering function for temporarily accumulating display data and the like which are supplied from the host processor 5 in the non-display period is required in the case of performing the control in such a way that a stream of display data are latched by the line latch circuit 23 and displayed in real time while avoiding use of the frame buffer memory 22 as far as possible. The following is conceivable as means for achieving such buffering function: using part of the memory region of the frame buffer memory 22; or using a series circuit previously prepared for the line latch circuit 23 and connected in series with the latch circuit.

Figure 5:
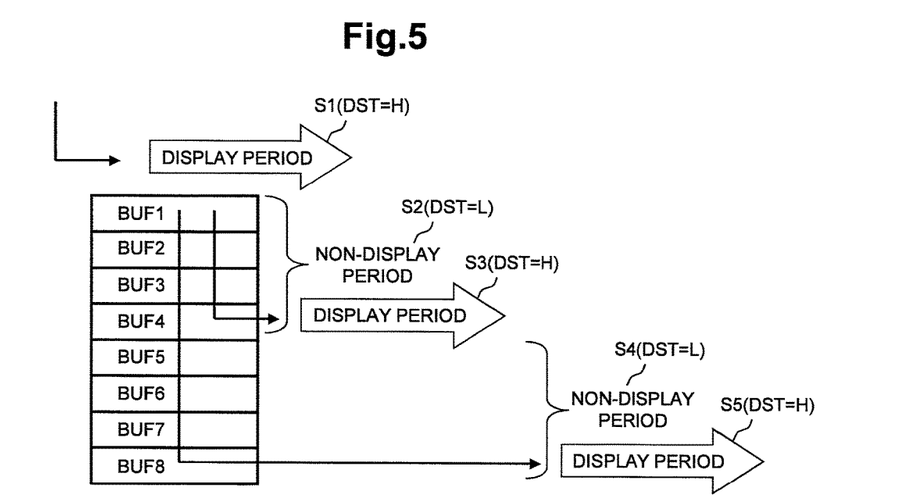
FIG. 5 is an explanatory diagram showing an example of materialization of a buffering function in a non-display period.

FIG. 5 shows an embodiment in which the buffering function is materialized in the non-display period. For instance, buffer regions BUF1 to BUF8 of eight lines each having one display line of memory capacity are prepared. As described above, the buffer regions BUF1 to BUF8 may be part of the memory region of the frame buffer memory 22, or a series circuit previously prepared for the line latch circuit 23, and connected in series with the latch circuit. Although no special restriction is intended, an embodiment in which two non-display periods are provided in one display frame, and each non-display period is arranged to have a length representing four display lines will be taken here for the sake of convenience. According to the embodiment of FIG. 5, in a high-level period of the display-status signal DST, the buffer regions BUF1 to BUF8 are not used for display data supplied by the host processor 5, and the display data are provided to the output-latch stage (not shown) of the line latch circuit 23, and then the signal-drive circuit 21 outputs gradation voltages (S1). Next, in case that the display-status signal DST is inverted into Low level, display data continuously supplied by the host processor 5 are sent to the first buffer region BUF1 to the subsequent stages and accumulated therein in turn (S2). This period is a non-display period, during which the display action remains stopped, and the display data supplied from the host processor 5 are accumulated in the buffer regions BUF1 to BUF4 temporarily. In this situation, in case that the display-status signal DST is turned to High level again, the action of supplying display data to the output stage of the line latch circuit 23 is started by use of the output of the buffer region BUF4 and thus, the signal-drive circuit 21 can be caused to output gradation voltages by use of subsequent display data without causing a loss of the subsequent display data after an elapse of delay time representing four display lines (S3). Next, on condition that the display-status signal DST is inverted into Low level, display data continuously supplied from the host processor 5 are sent to the subsequent stages starting with the buffer region BUF5, and accumulated there in turn (S4). This period is a non-display period, during which the display action remains stopped, and the display data supplied from the host processor 5 are accumulated in the buffer regions BUF5 to BUF8 temporarily. In this situation, in case that the display-status signal DST is turned to High level again, the action of supplying display data to the output stage of the line latch circuit 23 is started by use of the output of the buffer region BUF8 and thus, the signal-drive circuit 21 can be caused to output gradation voltages by use of subsequent display data without causing a loss of the subsequent display data after an elapse of delay time representing additional four display lines (eight display lines in total) (S5).

FIG. 6 shows, by example, another situation in which start timings of display and non-display periods are variably controlled. It is assumed here that the variable control is repeatedly performed in two display frames F1 and F2. Each display frame has two display periods and one non-display period; the display frames F1 and F2 are different from each other in both the start timings of the display and non-display periods. In the display frame F1, the start of the first display period DP1_Gr1 synchronizes with the start of a cycle of the vertical synchronizing signal; the start timing of the first non-display period NDP1_Gr1 subsequent thereto (coincident with the end timing of the first display period) is denoted by T1_Gr1; and the start timing of the subsequent display period DP2_Gr1 (coincident with the end timing of the first non-display period) is denoted by T2_Gr1. In the display frame F2, these timings are denoted by T1_Gr2, T2_Gr2 and T3_Gr2; and their periods are denoted by DP1_Gr2, NDP1_Gr2 and DP2_Gr2 respectively. The respective timings correspond to times in a frame cycle, and differ from one another. Although no special restriction is intended, the display periods PD1_Gri and PD2_Gri (i=1, 2) are different from each other.

Figure 7:
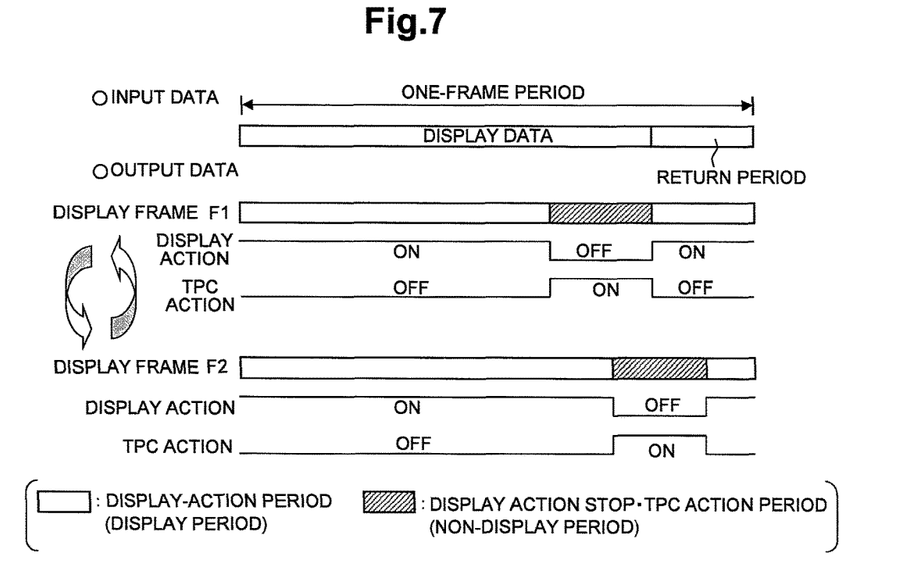
FIG. 7 is a timing diagram showing, by example, principal action timings in the case of performing the touch detection in a non-display period set in line with the non-display variable timing shown in FIG. 6.

FIG. 7 shows, by example, principal action timings in the case of performing the touch detection in a non-display period set in line with the non-display variable timing shown in FIG. 6. In FIG. 7, the column of the input data shows the action timing in case that the host device 5 provides display data to the liquid crystal driver 8; the column of the output data shows the action timing in case that the liquid crystal driver 8 outputs display data to the liquid crystal panel 2. The timing of the input data column and the timing of the output data column do not necessarily coincide with each other in terms of time; for the sake of convenience, one-frame periods (representing one cycle of the vertical synchronizing signal VSYNC) are parallelized to each other and shown. In the case of transferring to a display process after having stored display data in the frame buffer memory 22 for a time, the data output timing in the output data column is greatly delayed with respect to the data-input timing in the input data column. On the other hand, in the case of displaying display data supplied from the host processor 5 in real time as they are, the data-output timing of the output data column is delayed with respect to the data-input timing of the input data column by a length of time as long as a delay caused by the internal action. The notation ON concerning the display action in the drawing denotes a display period; and the notation OFF denotes a non-display period, which represents a period for the touch panel activation and detection (TPC action period). The non-display period is changed depending on the display frames F1 and F2.

Although not particularly shown in the drawing, the embodiments of the actions described with reference to FIG. 6 and FIG. 7 can be actualized by adopting a structure similar to that shown in FIG. 4; it is sufficient to just arrange two group of expected value data of the expected-value-register circuit 32.

Figure 8:
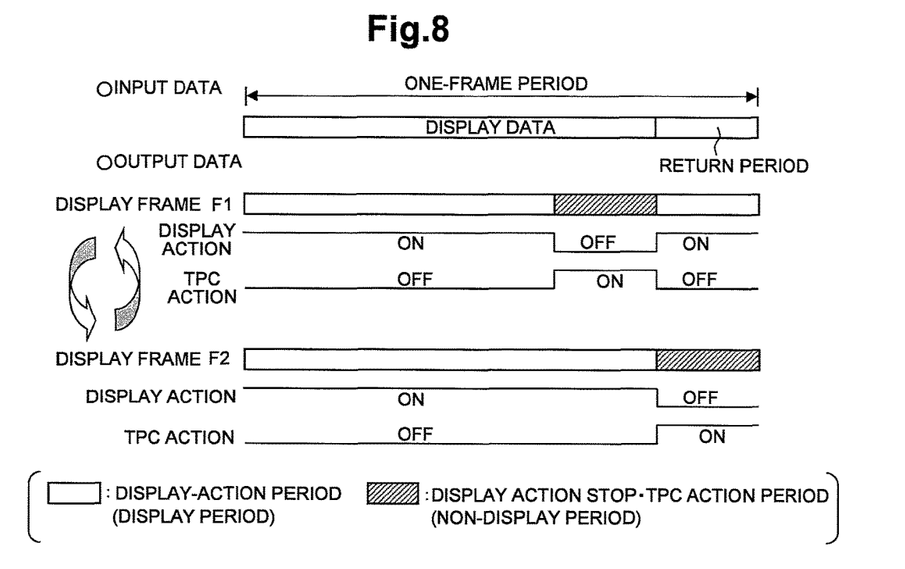
FIG. 8 is a timing diagram showing, by example, action timings in a case where one non-display period set with the non-display variable timing is arranged at the end of a frame cycle.

FIG. 8 shows, by example, action timings in a case where one non-display period set with the non-display variable timing is arranged at the end of a frame cycle. A non-display period to the frame cycle can be set anywhere in the frame cycle according to an expected value to be compared with the count value of the line counter 31.

Figure 9:
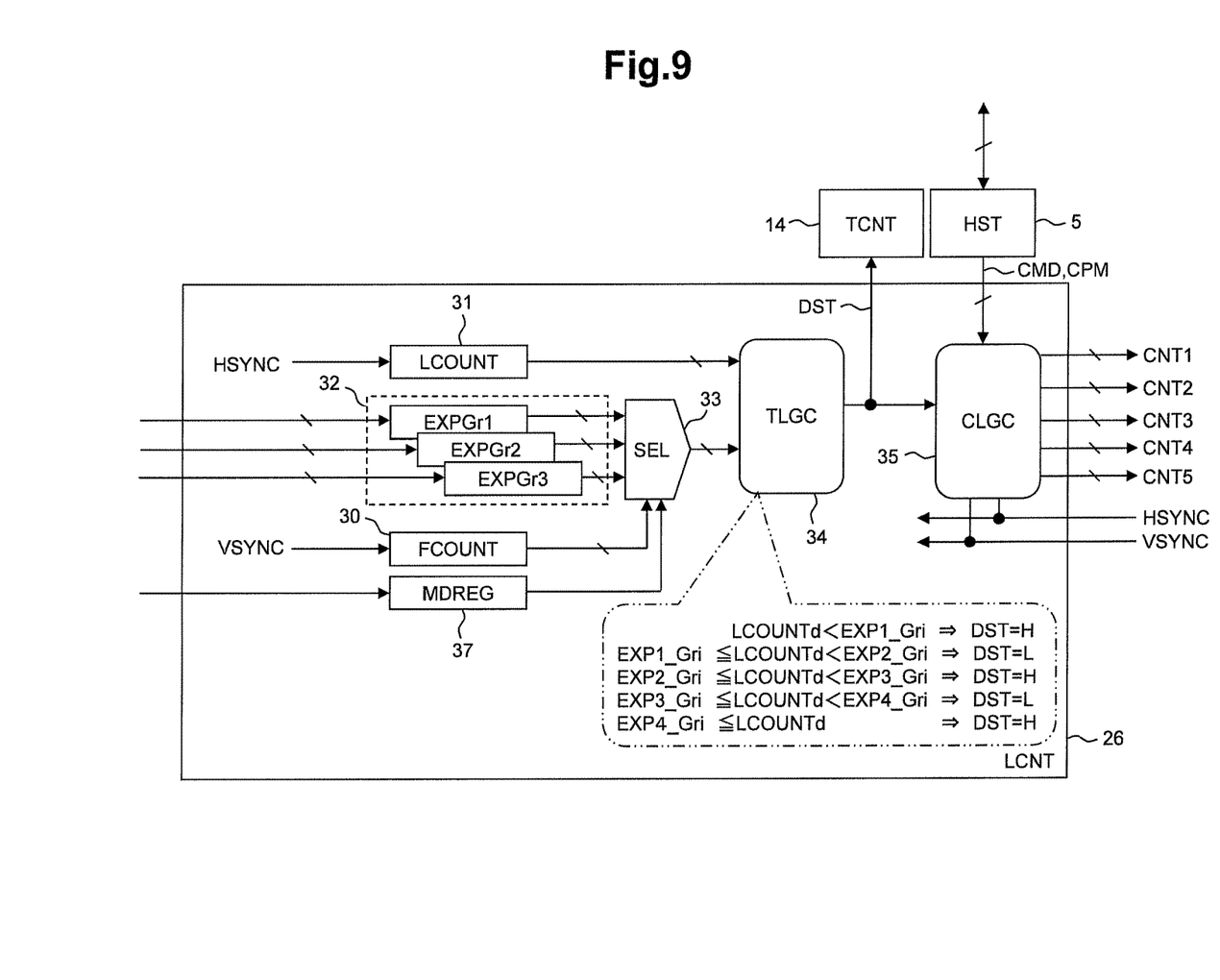
FIG. 9 is a block diagram showing another embodiment of the control logic operable to cyclically change start timings of display and non-display periods in units of display frames.

FIG. 9 shows, by example, another embodiment of the control logic operable to cyclically change start timings of display and non-display periods in units of display frames so that they never coincide with each other. The control logic shown in FIG. 9 is different from that shown in FIG. 4 in that a mode register (MDREG) 37 is provided; mode data for selecting, from expected value groups, a predetermined expected value group to be compared to the count value of the line counter 31 is set on the mode register. For instance, an input to the selector 33 is selected according to data set on the mode register 37. The mode register 37 can be rewritten by the host processor 5. Depending on mode data set on the mode register 37, it is possible to make a selection from display forms different from each other in the number of non-display periods as shown in FIG. 2 and FIG. 6 readily. Also, in this case, the start timings of display and non-display can be decided freely according to set values which are expected values set in expected value groups. The other structural features except the above are the same as those in FIG. 4 and as such, like parts in the many accompanied drawings are identified by the same reference numeral, character or label, and the detailed description thereof shall be skipped.

The above embodiments bring about the effects and advantages as described below.

(1) Because of variable start timings of display and non-display periods, the noise owing to actions of activation and display of the display panel 2, and the noise owing to actions of activation and detection of the touch sensor 3 do not affect each other. Further, the start timing of non-display is not fixed in a display frame and therefore, the appearance of an undesired difference in brightness owing to non-display in a fixed portion in a display frame can be suppressed. Especially, in the case of setting the non-display timing in a display frame more than once as in FIG. 2, an undesired difference in brightness attributed to non-display tends to easily become visible as flicker. However, such flicker owing to the difference in brightness can be made less prone to becoming visible by variable control of the non-display timing.

(2) As shown in FIG. 2 by example, two non-display periods can be set in a frame cycle and as such, the coordinate calculation for which data detected by means of touch sensing are used can be executed twice in one frame cycle. Therefore, the speed of response to touch sensing can be increased in comparison to the case of the coordinate calculation executed once per one frame cycle. In addition, since the start timing of a non-display period is variable, the flicker which is the undesired difference in brightness attributed to non-display becomes hard to see even if two or more non-display periods are included in one display frame. Also, in the case of setting one non-display period in a frame cycle, the start timing of a non-display period is still variable and as such, the flicker owing to an undesired difference in brightness attributed to non-display is hard to see in a display frame.

(3) As described with reference to e.g. FIG. 2, the start timings of display and non-display periods are cyclically changed in units of cycles of the vertical synchronizing signal VSYNC so that the start times of display and non-display periods complete a cycle in each sequence of cycles of the vertical synchronizing signal VSYNC. Thus, the variable control of the non-display timing can be performed efficiently.

(4) In a display form in which display data supplied from the host processor 5 are stored in the frame buffer memory 22 for a while, and then displayed in turn, the control of the non-display timing can be performed in a relatively simple way without losing display data which keep coming successively during a non-display period by adjourning the action of reading out data in units of display frames from the frame buffer memory 22 during the non-display period.

(5) As described with reference to FIG. 5, in a form in which display control is performed by supplying display data to the line latch circuit 23 in real time to perform without passing through the frame buffer memory 22 as far as possible, a delay buffer (buffer regions BUF1 to BUF8) for delaying the display control of display data by the non-display period is prepared in the frame buffer memory 22 or the line latch circuit 23 to perform the control such that display data are temporarily kept in a buffer region of the delay buffer during the non-display period. Therefore, the control which involves the step of forming the non-display timing in a frame cycle more than once can be performed in a relatively simple way.

(6) As described with reference to FIG. 4, by using the frame counter 30 and the line counter 31, making a comparison between the count value of the line counter and an expected value, and deciding the start timings of display and non-display periods, the timing control with flexibility can be realized in a relatively simple way. Especially, expected value groups each having expected values of the count value of the line counter 31 are selectively used according to the count value of the frame counter 30. Deciding the start-line position and the end-line position of the non-display period with the count timing of the line counter 31 matching with the expected value of the expected value group thus selected, the control logic of the timing logic 34 can be arranged by use of a magnitude-comparison circuit in a relatively simple way.

(7) Adopting the mode register 37 to rewritably set mode data for selecting a predetermined expected value group from among the expected value groups as in FIG. 9, it becomes possible to readily select optimal display and non-display timings according to a property of a display image, characteristics of touch and display panels, or the like.

The invention is not limited to the above embodiments. It is obvious that various modifications and changes thereof may be made without departing from the subject matter thereof.

For instance, the frame synchronizing signal is not limited to the vertical synchronizing signal, and it may be any signal as long as it has the synchronizing function. The dot matrix type display panel may be an electroluminescence panel which is limited to a liquid crystal panel. The invention can be widely applied to not only portable information terminals including tablets and smart phones, but also other information terminal devices. The liquid crystal driver, the touch panel controller, and the subprocessor are not limited as being formed in single chips respectively, and they may be incorporated in a multichip, or may be each built in a semiconductor IC.

What is claimed is:

1. A touch display control device comprising:
a display controller operable to perform display control in synchronization with a frame synchronizing signal which defines each frame period, wherein each frame period comprises:
a first display period,
a first non-display period following the first display period, and
a second display period following the first display period,
wherein a start time of a second display period in a first frame period is different than a start time of a second display period in a second frame period following the first frame period; and
a touch panel controller operable to perform a touch detection,
wherein the display controller is operable to control start times of display and non-display periods in each frame period,
wherein the touch panel controller is further operable to perform the touch detection in first non-display period,
wherein a start time of the first display period begins when the display controller drives a display, and
wherein the start time of the first non-display period begins when the display controller stops driving the display.

2. The touch display control device according to claim 1, wherein the display controller includes three display periods and two non-display periods in a cycle of the frame synchronizing signal.

3. The touch display control device according to claim 1, wherein the display controller includes two display periods and one non-display period in a cycle of the frame synchronizing signal.

4. The touch display control device according to claim 1, wherein the display controller changes the start times of the display and non-display periods in units of cycles of the frame synchronizing signal so that the start times of display and non-display periods complete a cycle in each sequence of cycles of the frame synchronizing signal.

5. The touch display control device according to claim 2, wherein the display controller changes the start times of the display and non-display periods in units of the cycles of the frame synchronizing signal so that the start times of the display and non-display periods complete a cycle in each sequence of cycles of the frame synchronizing signal.

6. The touch display control device according to claim 3, wherein the display controller changes the start times of the display and non-display periods in units of the cycles of the frame synchronizing signal so that start times of the display and non-display periods complete a cycle in each sequence of cycles of the frame synchronizing signal.

7. The touch display control device according to claim 2, wherein the display controller reads out data written in a buffer memory in units of display frames to perform display control, and adjourns the action of reading out data from the buffer memory in units of display frames during the first non-display period.

8. The touch display control device according to claim 3, wherein the display controller reads out data written in a buffer memory in units of display frames to perform display control, and adjourns the action of reading out data from the buffer memory in units of display frames during the first non-display period.

9. A touch display control device comprising:
a display controller operable to perform display control in synchronization with a frame synchronizing signal of a display frame; and
a touch panel controller operable perform a touch detection,
wherein the display controller is operable to change start times of display and non-display periods in a cycle of the frame synchronizing signal, and
wherein the touch panel controller is further operable to perform the touch detection in a non-display period,
wherein a start time of a display period begins when the touch panel controller drives the display,
wherein a start time of the non-display period begins when the touch panel controller stops driving the display, and
wherein the display controller includes three display periods and two non-display periods in the cycle of the frame synchronizing signal, uses a buffer memory as a delay buffer for delaying display control of display data by the non-display period, and starts the action of writing display data into the buffer memory from a first non-display period without writing display data into the buffer memory from a display period at a beginning of a display frame to the first non-display period, starts reading out display data written in the buffer memory from an end of the first non-display period, suspends reading out from the buffer memory in line with the start of a subsequent display period, and resumes reading out from the buffer memory at an end of a subsequent non-display period.

10. The touch display control device according to claim 3, wherein the display controller uses a buffer memory as a delay buffer for delaying display control of display data with the non-display period, and begins writing display data into the buffer memory from a first non-display period without writing display data into the buffer memory from a display period at a beginning of a display frame to the first non-display period, and reads out display data written in the buffer memory from an end of the first non-display period.

11. The touch display control device according to claim 4, wherein the display controller includes: a frame counter operable to count display frames based on the frame synchronizing signal; a line counter operable to count display lines based on a display-line-synchronizing signal in a display frame; and a logic circuit operable to decide start times of display and non-display periods based on a result of a comparison between a count value of the line counter and an expected value thereof, and a count value of the frame counter, wherein the expected value of the count value of the line counter is changed according to the count value of the frame counter.

12. The touch display control device according to claim 5, wherein the display controller includes: a frame counter operable to count display frames based on the frame synchronizing signal; a line counter operable to count display lines based on a display-line-synchronizing signal in a display frame; and a logic circuit operable to decide start times of display and non-display periods based on a comparison between a count value of the line counter and an expected value thereof, and a count value of the frame counter, wherein the expected value of the count value of the line counter is changed according to the count value of the frame counter.

13. The touch display control device according to claim 6, wherein the display controller includes: a frame counter operable to count display frames based on the frame synchronizing signal; a line counter operable to count display lines based on a display-line-synchronizing signal in a display frame; and a logic circuit operable to decide start times of display and non-display periods based on a comparison between a count value of the line counter and an expected value thereof, and a count value of the frame counter, wherein the expected value of the count value of the line counter is changed according to the count value of the frame counter.

14. The touch display control device according to claim 12, wherein the logic circuit selects one group of expected value groups having expected values of the count value of the line counter according to the count value of the frame counter, and determines start-line and end-line positions of the non-display period with a count time of the line counter matching an expected value of the selected expected value group.

15. The touch display control device according to claim 13, wherein the logic circuit selects one group of expected value groups having expected values of the count value of the line counter according to the count value of the frame counter, and determines start-line and end-line positions of the non-display period with a count timing of the line counter matching an expected value of the selected expected value group.

16. The touch display control device according to claim 14, wherein the logic circuit selects one group of expected value groups having expected values of the count value of the line counter according to the count value of the frame counter, and determines start-line and end-line positions of the non-display period with a count timing of the line counter matching an expected value of the selected expected value group.

17. The touch display control device according to claim 14, wherein the display controller includes a mode register for selecting, from the expected value groups, a predetermined expected value group having mode data compared to the count value of the line counter that is rewritably set.

18. The touch display control device according to claim 15, wherein the controller further includes a mode register for selecting, from the expected value groups, a predetermined expected value group having mode data compared to the count value of the line counter is that rewritably set.

19. A touch display control device comprising:
a display controller operable to perform display control in synchronization with a frame synchronizing signal of a display frame; and
a touch panel controller operable to perform a touch detection,
wherein the display controller is operable to change start times of display and non-display periods in a cycle of the frame synchronizing signal,
wherein the touch panel controller is further operable to perform the touch detection in a non-display period,
wherein a start time of a display period begins when the display controller drives the display,
wherein a start time of the non-display period begins when the display controller does stops driving the display, and
wherein the display controller further includes: a frame counter operable to count display frames based on the frame synchronizing signal; a line counter operable to count display lines based on a display-line-synchronizing signal in a display frame; and a logic circuit operable-to decide start times of display and non-display periods based on a comparison between a count value of the line counter and an expected value thereof, and a count value of the frame counter, wherein the expected value of the count value of the line counter is changed according to the count value of the frame counter, wherein the logic circuit selects one group of expected value groups having expected values of the count value of the line counter according to the count value of the frame counter, and determines start-line and end-line positions of the non-display period with a count timing of the line counter matching an expected value of the selected expected value group, and wherein the display controller further includes a mode register for selecting, from the expected value groups, a predetermined expected value group to be compared to the count value of the line counter that is rewritably set.

20. The touch display control device according to claim 1 formed as a semiconductor substrate.

21. An information device, comprising:
a touch panel enabling a touch detection;
a display controller operable to perform display control in synchronization with a frame synchronizing signal of a display frame; and
a touch panel controller operable to perform a touch detection,
wherein the display controller is capable of controlling times of display and non-display periods in each frame period, wherein each frame period comprises:
a first display period;
a first non-display period following the first display period, and
a second display period following the first display period,
wherein a duration of a first display period in a first frame period is different than a duration of a first display period in a second frame period following the first frame period, and
wherein the touch panel controller performs the touch detection in the first non-display period,
wherein a start time of the first display period begins when the display controller drives the display, and
wherein a start time of the first non-display period begins when the display controller stops driving the display.

* * * * *

UNITED STATES PATENT AND TRADEMARK OFFICE
CERTIFICATE OF CORRECTION

PATENT NO. : 10,242,640 B2
APPLICATION NO. : 14/147512
DATED : March 26, 2019
INVENTOR(S) : Shigeru Ota et al.

Page 1 of 1

It is certified that error appears in the above-identified patent and that said Letters Patent is hereby corrected as shown below:

In the Claims

In Column 17, Line 8, in Claim 9, after "operable" insert -- to --.

In Column 18, Line 46, in Claim 18, delete "is that" and insert -- that is --, therefor.

In Column 18, Line 62, in Claim 19, after "display," delete "and".

Signed and Sealed this
Fourteenth Day of April, 2020

Andrei Iancu
*Director of the United States Patent and Trademark Office*